(12) United States Patent
Timoner et al.

(10) Patent No.: US 11,269,244 B2
(45) Date of Patent: *Mar. 8, 2022

(54) SYSTEM AND METHOD FOR CALIBRATING A DISPLAY SYSTEM USING MANUAL AND SEMI-MANUAL TECHNIQUES

(71) Applicant: Scalable Display Technologies, Inc., Cambridge, MA (US)

(72) Inventors: Samson J. Timoner, Cambridge, MA (US); Tyler M. Johnson, South Boston, MA (US); Eugene Hsu, Cambridge, MA (US); Rajeev J. Surati, Cambridge, MA (US); Kevin Amaratunga, Belmont, MA (US)

(73) Assignee: Scalable Display Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,759

(22) Filed: Dec. 9, 2019

(65) Prior Publication Data

US 2020/0192201 A1 Jun. 18, 2020

Related U.S. Application Data

(63) Continuation of application No. 15/181,376, filed on Jun. 13, 2016, now Pat. No. 10,503,059, which is a
(Continued)

(51) Int. Cl.
*G03B 21/14* (2006.01)
*G06T 5/00* (2006.01)
*H04N 9/31* (2006.01)

(52) U.S. Cl.
CPC ............ *G03B 21/147* (2013.01); *G06T 5/006* (2013.01); *H04N 9/3147* (2013.01); *H04N 9/3185* (2013.01); *H04N 9/3197* (2013.01)

(58) Field of Classification Search
CPC ..... G02B 21/147; G06T 5/006; H04N 9/3185
(Continued)

(56) References Cited

U.S. PATENT DOCUMENTS 6,456,339 B1  9/2002  Surati
6,520,647 B2  2/2003  Raskar
(Continued)

FOREIGN PATENT DOCUMENTS

CN    1698358 A   11/2005
CN   101132535 A    2/2008
(Continued)

OTHER PUBLICATIONS

Green, et al., "A New Computer-Human Interface for Aligning and Edge-Matching Multichannel Projector Systems", May 24, 1988, pp. 109-112, vol. 19, No. 1988, Publisher: International Symposium of the SID, Published in: US.
(Continued)

*Primary Examiner* — Jerry L Brooks
(74) *Attorney, Agent, or Firm* — Loginov & Associates, PLLC; William A. Loginov (57) ABSTRACT

The invention provides a system and method that reduces the precision of the manual alignment process. Users select correspondences between projectors or components of a projector, to form a common coordinate. Using models of the display system, and projectors, the common coordinate system can be mapped quickly to the entire display. The process avoids a need to measure screen points, and allows the user to move significantly fewer points. Alternatively, the invention allows introduction of machine-vision style algorithms into manual calibration techniques to improve performance. This overcomes the tediousness of prior systems by introducing models of the display into the manual alignment process, allowing selection of a small number of
(Continued)

points on each projector, and avoiding selection of precisely measured screen points. The system conversely finds correspondences between projectors, allowing mapping of the projectors into a common coordinate system, and quick warping of the coordinate system to the screen.

18 Claims, 8 Drawing Sheets

Related U.S. Application Data continuation of application No. 13/296,864, filed on Nov. 15, 2011, now Pat. No. 9,369,683.

(60) Provisional application No. 61/413,520, filed on Nov. 15, 2010.

(58) Field of Classification Search
USPC .......................................................... 353/30
See application file for complete search history.

(56) References Cited

U.S. PATENT DOCUMENTS

| | | | |
|---|---|---|---|
| 6,527,395 B1 | 3/2003 | Raskar | |
| 6,677,956 B2 | 1/2004 | Raskar | |
| 6,709,116 B1 | 3/2004 | Raskar | |
| 6,715,888 B1 | 4/2004 | Raskar | |
| 6,729,733 B1 | 5/2004 | Raskar | |
| 6,733,138 B2 | 5/2004 | Raskar | |
| 6,755,537 B1 | 6/2004 | Raskar | |
| 6,764,185 B1 | 7/2004 | Beardsley | |
| 6,781,591 B2 | 8/2004 | Raskar | |
| 6,793,350 B1 * | 9/2004 | Raskar | G03B 37/04 |
| | | | 353/121 |
| 6,811,264 B2 | 11/2004 | Raskar | |
| 6,834,965 B2 | 12/2004 | Raskar | |
| 7,001,023 B2 | 2/2006 | Lee | |
| 7,131,733 B2 | 11/2006 | Shibano | |
| 7,137,707 B2 | 11/2006 | Beardsley | |
| 7,154,395 B2 | 12/2006 | Raskar | |
| 7,242,818 B2 | 7/2007 | Beardsley | |
| 7,252,387 B2 | 8/2007 | Raskar | |
| 7,292,269 B2 | 11/2007 | Raskar | |
| 7,355,583 B2 | 4/2008 | Beardsley | |
| 7,421,111 B2 | 9/2008 | Dietz | |
| 10,503,059 B2 * | 12/2019 | Timoner | H04N 9/3185 |
| 2004/0184013 A1 | 9/2004 | Raskar | |
| 2005/0206857 A1 * | 9/2005 | Yamada | G03B 21/56 |
| | | | 353/94 |
| 2006/0192925 A1 * | 8/2006 | Chang | H04N 9/3147 |
| | | | 353/94 |
| 2008/0136976 A1 * | 6/2008 | Ajito | G03B 37/04 |
| | | | 348/745 |
| 2008/0246781 A1 | 10/2008 | Surati | |

FOREIGN PATENT DOCUMENTS

| | | |
|---|---|---|
| JP | 2000105813 | 4/2000 |
| JP | 2000105813 A | 4/2000 |
| JP | 2005004201 A | 1/2005 |
| JP | 2008113176 A | 5/2008 |
| JP | 2006221599 A | 8/2008 |
| JP | 2009077167 A | 4/2009 |
| KR | 20050004025 | 1/2005 |
| KR | 20050004025 A | 1/2005 |
| KR | 20070078684 | 8/2007 |
| KR | 20070078684 A | 8/2007 |
| WO | 2004084547 A | 9/2004 |
| WO | 2008007507 | 1/2008 |
| WO | 2008007507 A1 | 1/2008 |
| WO | 2006025191 A1 | 5/2008 |

OTHER PUBLICATIONS

Raskar, et al., "Multi-Projector Displays Using Camera-Based Registration", "Visualization '99", Oct. 29, 1999, pp. 1-9, Publisher: Proceedings San Francisco CA USA, Published in: US.

Barco, "Projector Toolset, Reference Manual", Apr. 16, 2009, pp. 1-245, Publisher: Barco.

Christie Digital Systems, "Christie Twist, User Manual", Jun. 1, 2010, pp. 1-41, No. 20-100143-07, Publisher: Christie Digital Systems.

Amaratunga, "U.S. Appl. No. 12/818,102, System and Method for Injection of Mapping Functions", filed Jun. 17, 2010, Published in: US.

Hereld et al, "Developing Tiled Projection Display Systems", 2000, Published in: USA.

Barco, "Projector Toolset, User Manual", Barco, (Apr. 16, 2009), pp. 1-245.

* cited by examiner

SYSTEM AND METHOD FOR CALIBRATING A DISPLAY SYSTEM USING MANUAL AND SEMI-MANUAL TECHNIQUES

RELATED APPLICATION

This application is a continuation of U.S. patent application Ser. No. 15/181,376, filed Jun. 13, 2016, entitled SYSTEM AND METHOD FOR CALIBRATING A DISPLAY SYSTEM USING MANUAL AND SEMI-MANUAL TECHNIQUES, which is a continuation of U.S. patent application Ser. No. 13/296,864, filed Nov. 15, 2011, issued on Jun. 14, 2016 as U.S. Pat. No. 9,369,683, entitled SYSTEM AND METHOD FOR CALIBRATING A DISPLAY SYSTEM USING MANUAL AND SEMI-MANUAL TECHNIQUES, which application claims the benefit of U.S. Provisional Application Ser. No. 61/413,520, filed Nov. 15, 2010, entitled SYSTEM AND METHOD FOR CALIBRATING A DISPLAY SYSTEM USING MANUAL AND SEMI-MANUAL TECHNIQUES, the entire disclosures of each of which is herein incorporated by reference.

FIELD OF THE INVENTION

This invention is related to displays, and focused on, but not exclusive to, multi-projection display systems. More particularly, this invention is related to calibration of such displays and display systems.

BACKGROUND OF THE INVENTION

People love to see imagery all around them. Size, brightness, resolution, contrast ratio, 3D and many other features attract the attention of viewers. The goal in creating a display system is to create the best experience possible for the viewer. Creating the best experience often means optimizing the quality of the display. Quality factors include, but are not limited to, geometric accuracy, color accuracy, contrast, resolution, and freedom from distracting artifacts and other performance properties which contribute to the generally pleasing nature of the image. These factors may also include allowing the displayed digital image to accurately represent the original digital image or an image found in nature. To achieve the best possible experience for the user, and/or quality of the display, it is desirable to correct for certain inaccuracies in the image produced by a display by applying corrective measures to image information and tuning the operating point of the display system.

Display systems are composed of one or more display units. Display units may be a variety of types, including, but not limited to, flat panel displays, projectors, emissive displays, e-ink displays, etc. They may be flat or curved. Examples of such displays are listed in commonly assigned U.S. Published Patent Application No. 2008/0246781 A1, entitled SYSTEM AND METHOD FOR PROVIDING IMPROVED DISPLAY QUALITY BY DISPLAY ADJUSTMENT AND IMAGE PROCESSING USING OPTICAL FEEDBACK (claiming the benefit of U.S. Provisional Application Ser. No. 60/895,070) and U.S. patent application Ser. No. 12/818,102, entitled SYSTEM AND METHOD FOR INJECTION OF MAPPING FUNCTIONS whose disclosures are included here by reference by way of useful background information. Each of these types of display unit may suffer from different artifacts.

Flat panel type displays, for example, often suffer from color and intensity sheen within panels, and color and intensity differences across panels. They may also suffer from different input-output curves. For example, two or more discrete displays can show the low intensity gray levels very similarly, but the high intensity gray levels may vary widely from panel to panel. Problematic geometric issues may also arise due to occlusions by panel bezels, misalignment of multiple-panels, the desire for unusual display shapes within a panel, panels being aligned in shapes such as a cylinder, etc.

Projection-based displays suffer from geometric distortions, sometimes on a per-color channel, often as a result of imperfect optics in the projectors. They also suffer from intensity variations within and across projectors, color sheens, color mismatches across projectors, varying black levels, different input-output curves, etc., For the display of 3D images, often a different image is respectively presented to the right eye and the left eye. Methods for accomplishing this can include using time to alternate images delivered to each eye, using properties of the light such as polarization or wavelength to select which eye will receive a particular image, using optics to attempt to deliver a different image to each eye based on the eye's spatial location, etc. For 3D images, as with standard images, there may be geometric artifacts, color and intensity artifacts, and potentially different artifacts for the image intended for each eye.

Corrections made to the system can occur at many stages in the chain to displaying the image. One example of a correction can occur in the creation of the digital signal, such as described in detail in the above-incorporated SYSTEM AND METHOD FOR INJECTION OF MAPPING FUNCTIONS. One particular example is shown and described relative to the projector or intermediate warping boxes such as the OMTE parameters, as described in detail in the above-incorporated U.S. Patent Application entitled SYSTEM AND METHOD FOR PROVIDING IMPROVED DISPLAY QUALITY BY DISPLAY ADJUSTMENT AND IMAGE PROCESSING USING OPTICAL FEEDBACK.

The types of corrections generally contemplated herein include warping imagery onto the screen. If using projectors, one correction entails blending imagery across projectors so that the total intensity of a region overlapped by multiple projectors is similar intensity to the rest of the display. Corrections for color and intensity changes both across display units and within display units are also contemplated. This discussion focuses on geometrical changes. Many types of imagery could be shown on the scene. Sometimes the content is effectively a rectangular image that may be blended and warped onto the screen. Sometimes the content consists of many views of a three dimensional scene, where potentially each display unit may be given a different view of a three dimensional scene, and each display units stretches and warps the views so that the resulting display system appears to show one very large view of the entire system. In this case, the content is often rendered using a three-dimensional rendering engine like OpenGL or DirectX.

Manual geometric calibration is the process of having a user specify the geometric correction (the warp) of imagery intended to be shown on a display unit. For manual geometric calibration, the state of the art generally involves the application of substantial precision, which is often tedious to achieve.

The most common method for manual calibration of projectors in a conventional implementation occurs with perfect alignment on a flat screen. For the case of a 1×N array of projectors, for example, these projectors are set up so that the projected images have no relative vertical shift, and a known horizontal shift. In this case, the mapping from input imagery to the screen is typically very straightforward. For a horizontal setup, the left portion of the image goes to the left-projector; the next projector shows some of the same pixels (for the overlap region) and then the pixels directly to the right. The mapping to the screen of the input imagery is therefore an identity warp, with portions of the imagery distributed to each projector. In this case, the precision and tediousness comes in two places. First, the projectors must be aligned—a challenging and difficult process. Second, the transfer function from the projectors to the screen must be very close to a scale mapping. To achieve this degree of precision in the mappings often requires projectors with expensive optics.

If the projectors are not precisely aligned, or the mapping is not a perfect scale factor, a second method of manual calibration involves moving a significant number of points to indicate the correction that should be applied to each projector. Often the points are selected with a pointing device such as a mouse. Two standard examples include the use of applications such as Watchout™ (available from Dataton of Linkoping Sweden), and the eWarpDesigner™ (available from Flexible Picture Systems, Richmond Hill, Ontario, Canada). In each of these exemplary applications, the user has a grid of points that start as evenly spaced across the projector. They are moved to indicate where an image that is sent to the projector should actually be shown on that projector; that is, the points indicate a warp to the input image that is to be projected on the screen. Often, something of the order of a 7 by 9 grid of points (as is often done in the eWarpDesigner), 63 points per projector, must be moved and generally moved precisely. The work is tedious. Often, to be accomplished accurately, the screen is pre-measured and small dots are placed on the screen so that users can move points on the projectors to the correct place on the screen, so that an image will be mapped to the screen correctly. Precision is often required, particularly in an overlap region where small misalignments can become noticeable as a shadowing effect when the final imagery is displayed. Overall, lack of precision can result in artifacts such as an image moving across the display system shrinking and expanding as it moves, or oscillating up and down slightly.

Another example of manual calibration is the application from 3D Perception (Norway). In the software that ships with their compactU™ warping boxes, the user may have a model of where each projector is in 3D space, how it projects its image, and a model of the screen. The starting point can be very helpful, as there is an initial estimate of the warp for the system, but once again, in order to refine the model to achieve good alignment between the projectors, many points on each projector must be moved separately to modify the warps to match from one projector to another.

These kinds of manual methods for modifying and updating warps typically do not use the shape of the screen, or the fact that display units can be modeled—such as a projector as a 4×3 projection matrix with radial distortion, for example. And, they do not use any algorithms that form constraints between the projectors. Effectively, these methods do not use mathematical tools like those used in machine vision that have been created to effectively model 3D scenes, and objects whose geometric properties are dominated by optical principles. Furthermore, these methods typically attempt to warp each projector independently to the screen. They do not try and map projectors to a common coordinate system using points selected in the overlap region, and then take that common coordinate system and warp it to the screen. The goal of this patent is to use the information just described to reduce the tediousness and precision that is often required in a geometric manual calibration of a system.

SUMMARY OF THE INVENTION

The invention overcomes disadvantages of the prior art by reducing the tediousness and precision of the manual alignment process. Users select correspondences between projectors and/or correspondences between components of a single projector, allowing them to form a common coordinate system across the projector system. Using models of the display system, and projectors, the users can then quickly maps that common coordinate system to the entire display. In the process, the illustrative embodiment avoids a need to precisely measure points on the screen, and generally allows the use to move much fewer points in the calibration process.

Stated alternatively, a goal of the invention is to introduce machine-vision style algorithms into manual calibration techniques to render them faster, easier and less tedious. The system and method thereby overcomes the tediousness of the state of the art by introducing models of the display system into the manual alignment process. It allows the user to select a relatively small number of points on each projector, and to avoid selecting precisely measured points in the screen. Instead, the system and method finds correspondences between projectors, which allows the mapping of the projectors into a common (world) coordinate system, and then allowing the user to quickly warp that common coordinate system to the screen.

BRIEF DESCRIPTION OF THE DRAWINGS

The invention description below refers to the accompanying drawings, of which.

DETAILED DESCRIPTION

I. Illustrative Embodiments

Figure 1:
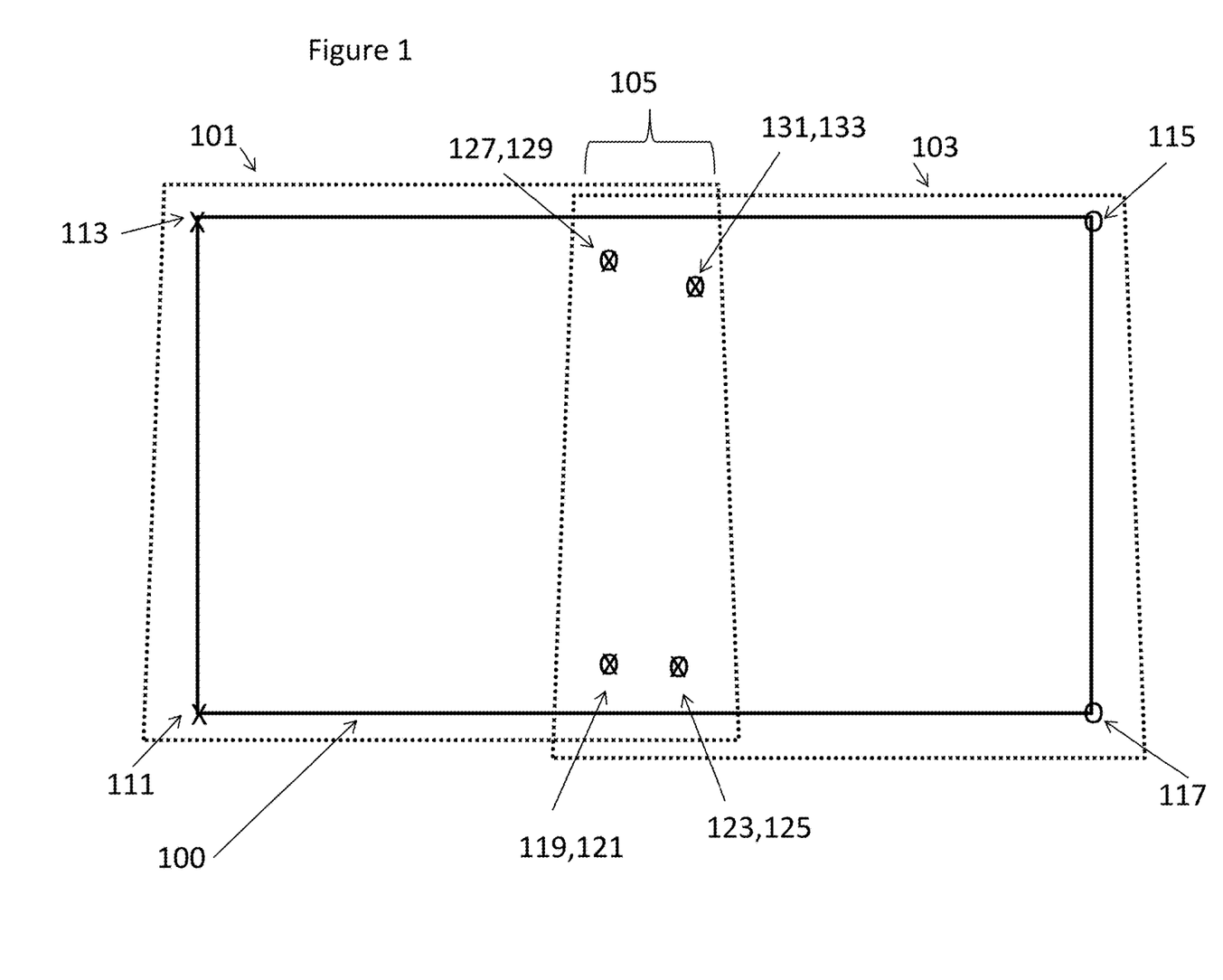
FIG. 1 is a block diagram of an exemplary display system with manual calibration in accordance with a generalized embodiment of this invention.

FIG. 1 shows the outlines 101 and 103 of two projected images from two projectors landing on flat screen region 100. The outlines do not need to be rectangular and are drawn in the FIGURE as trapezoids by way of example. A variety of geometric shapes are expressly contemplated in further examples. In overlap region 105, both projectors overlap on the screen 100. In that region 105, locations are selected on each of the two projectors. A user can accomplish this using a mouse for example, and clicking on each projector in an overlapping location. Each "X" indicates a location selected by the user or by another mechanism on projector 101, and each "O" indicates locations selected on projector 103. In the overlap region 105, four X-O correspondence pairs are shown: X (127) to O (129), X (131) to O (133), X (119) to O (121), and X (123) to O (125). Those correspondence pairs can be used to form a mapping from one projector to another. Four pairs are enough to form a homography between the projectors. A homography is a good choice for mapping between the projectors for a flat screen because it reasonably accurately represents the mapping from one projector to the other. Other mapping arrangements and implementations are possible, including mappings based on bilinear mapping, radial basis functions, quadrics, splines, triangle-meshes, etc. The mapping should generally include some amount of inherent smoothness, or be constrained in some way so as to create a smooth representation, so as to be representative of the smooth mappings typically expected from the input image of projectors to the projected image. Some mappings, such as bilinear, do not require four correspondences, while other mapping types might require more correspondences to adequately map the two geometries to each other. The selected points are not required to lie in any particular measured positions. Rather, the selected points can be located at nearly anywhere in the overlap region, which we refer to this as positioning the correspondence points in an arbitrary locations, that is locations not required to lie on a particular spot on the screen. The only constraints on the correspondences are typically those of the mapping themselves. For example, the four correspondences may not be co-linear for the case of a homography.

Once the mapping is developed between the projectors, a common (world) coordinate system can be defined, and the user can map an image to that coordinate system and across the two projectors onto the screen.

Once the mapping is established, the user (or another mechanism) can select points 111, 113, 115 and 117 at the corners of the screen and form a homography from the common coordinate system to the screen. In an ideal implementation, the image on the screen can be updated in real time so that the user can see an image move as he or she selects the points.

If the system includes more than two projectors in the overall group, then the above-described process as shown in FIG. 1 can be performed for each pair of projectors in the overall group. Without limitation, a conventional least squares approach for example, can be used to fix any disagreements between the pair-wise mappings. That is, one can find the set of mappings that minimize the sum squared error for each correspondence pair. If more than two projectors share the same overlap region, it may be helpful to use the same correspondence across more than two projectors, but it is not generally a requirement. Note that often edge-blending is used in multi-projector systems to balance intensity, and the parameters of such a blend can be calculated in well-known ways using the mappings found.

Figure 2:
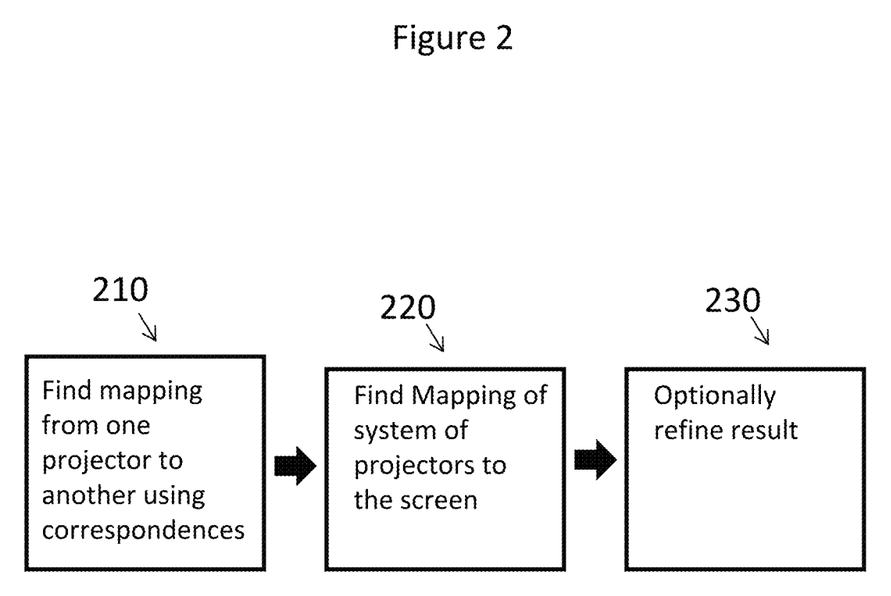
FIG. 2 is a flow diagram indicating the steps of finding the manual geometric calibration.

FIG. 2 shows a procedure including the general steps for finding the manual geometric calibration of a system having a plurality of projectors. In the first step 210, a mapping from one projector to another projector is found using correspondences. That allows the forming of a single coordinate system across the projectors. In the second step 220, the user or another mechanism finds a mapping from the single coordinate system to the screen. In the last step 230, the user or another mechanism optionally refines the system.

Figure 3:
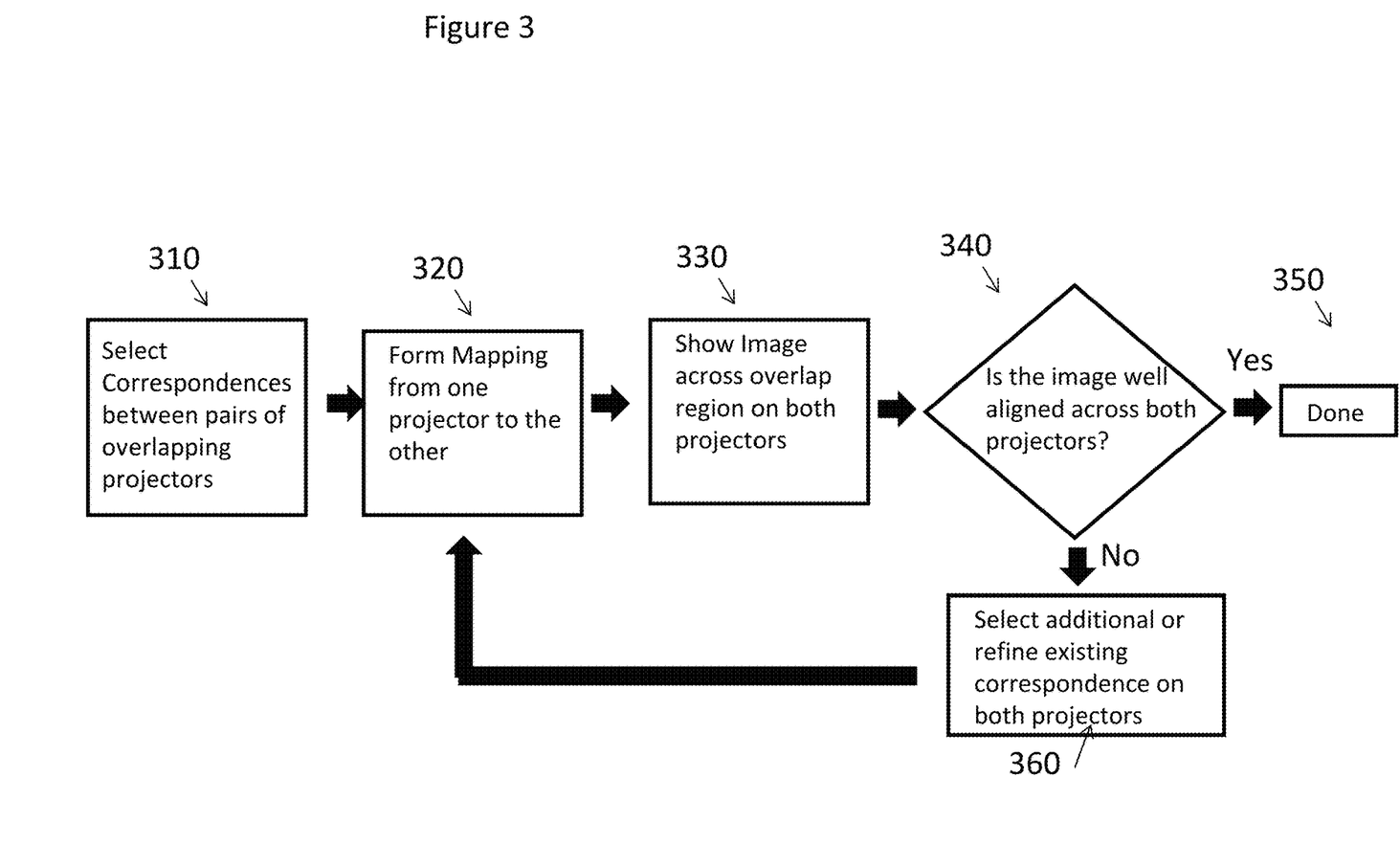
FIG. 3 is a flow diagram showing the step of finding a mapping from one projector to another.

FIG. 3 shows a process of perfecting the mapping between projectors. First a user or another mechanism selects correspondences in step 310. Then, the user or another mechanism forms a mapping between the pairs of projectors (step 320) and shows an image in at least the overlap region of a pair (step 330). By observing the overlapping image in the pair of projectors, the user or another mechanism can decide if that mapping is acceptable or should be further refined (decision step 340). If desirable, the user or the mechanism can then refine the existing correspondences in an effort to render them more accurate, or select additional correspondences (step 360). Refining in this case can entail fine-tuning the exact location of where a piece of the input imagery lands on the screen, as described below. The complexity of the mapping in 320 can then be increased—for example, by adding more parameters to the mapping. Alternatively, the mapping can be updated in an effort to obtain a better fit. As a further alternative, the disagreement between the correspondences after the mapping can be defined as a displacement field, and that displacement field can be corrected using splines or other representations of a displacement field. The user or other mechanism can repeat the process of adding and/or modifying correspondences until complete (step 350).

Notably, once a mapping has been formed, an additional step can be performed in various embodiments. A location is selected on one projector and it is moved to match a location on the second projector. That is, once a mapping has been formed, a user or other mechanism can explicitly select locations in one projector, but implicitly select locations in the second projector.

Figure 4:
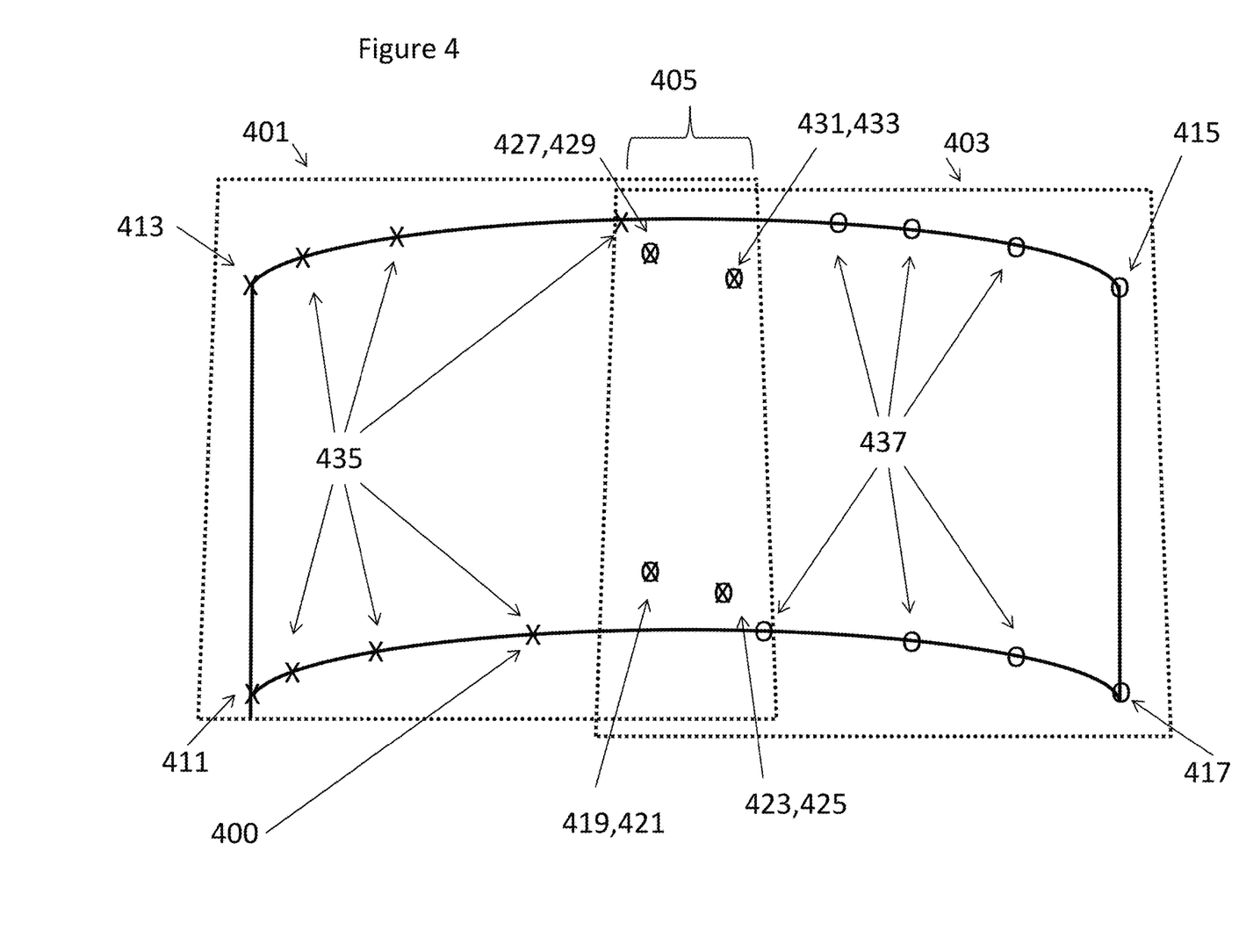
FIG. 4 is a block diagram of an exemplary display system with manual calibration using a cylinder screen.

In FIG. 4, the process of FIG. 1 is performed with an exemplary cylindrical screen 400. The outline of the projected image from two projectors, 401 and 403 is shown. There is an overlap region 405 where correspondence X-O pairs X (419) to O (421) and X (423) to O (425) and X (427) to O (429) and X (431) to O (433) have been chosen in substantially the same manner as the above-described flat screen example. The two projectors 401, 403 can be mapped to a common coordinate system using a homography and a single image can be shown across the entire system in the manner generally described herein. Because the screen is curved in this example, four points may not be enough to form an acceptable alignment in the overlap region, in which case more correspondences can be picked as described with FIG. 3, refining the homography to a more complex displacement representation to find a more exact representation of the mapping. Once a common coordinate system is formed, a single image can be displayed across the entire system. Often, the corner points 411, 413, 415 and 417 can be chosen in a straightforward manner, as these points define the desired fill region on the screen. Additionally, the user or another mechanism can select points along the edges, typically the top and bottom edges of the screen, to which a curve can be fit and manipulated to describe the fill region. These are points 435 and 437 in the projected image. The points need not be chosen in a uniformly spaced manner across that curve, and thus their position need not be known exactly. A sufficient number of points are chosen to accurately represent the curve on the top and bottom of the image.

The projectors can be treated as objects with optical properties. For example, those properties can include: focal length, position, orientation, displacement of the optical axis from the center of the projected image. A minimization is chosen to optimize these parameters while minimizing the least square error of the distance of the corner points from their points projected back into the projector, squared distance of points on the selected edge-curves projected back into the projector from the edges of the cylinder in the projector according to the current set of parameters, and the squared distance between the rays of the two projectors that are supposed to intersect at the correspondences. Once the minimization converges, an image can be projected on the screen so that the image horizontal direction of the image is evenly spread out along the width of the cylinder, and the vertical direction of the image is evenly spread out along the height of the cylinder.

Figure 5:
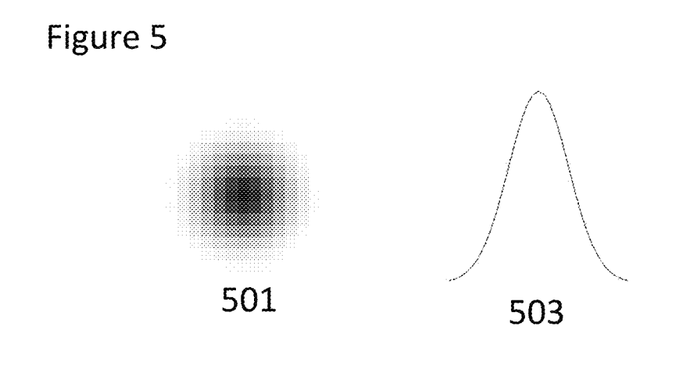
FIG. 5 is a diagram showing an example of a cross section of a feature to be displayed on the screen to achieve sub-pixel alignment accuracy.

FIG. 5 is an example of a fiducial that is a useful tool for finding corresponding locations on the screen to sub-pixel accuracy. The depicted fiducial 501 is a Gaussian function in two dimensions (i.e. orthogonal x-y axes within the plane of the image). Such a function can be displayed on each projector and moved toward each other, and then aligned. In this manner, the center of each Gaussian can form the correspondence. The curve 503 shows an intensity cross section of a Gaussian function. Blurry or anti-aliased fiducials like these are useful in that the human eye is proficient at averaging over a region. By placing two fiducials with intensity fall-offs in regions overlapping on a pair projectors, the user can move the fiducials by one half-pixel or less, and the eye can observe and detect differences in the agreement of the overlap, and move the fiducials to account for that disagreement. It is expressly contemplated that various trained machine vision tools can be substituted for the eye for performing the determination of overlap agreement in alternate embodiments.

Figure 6:
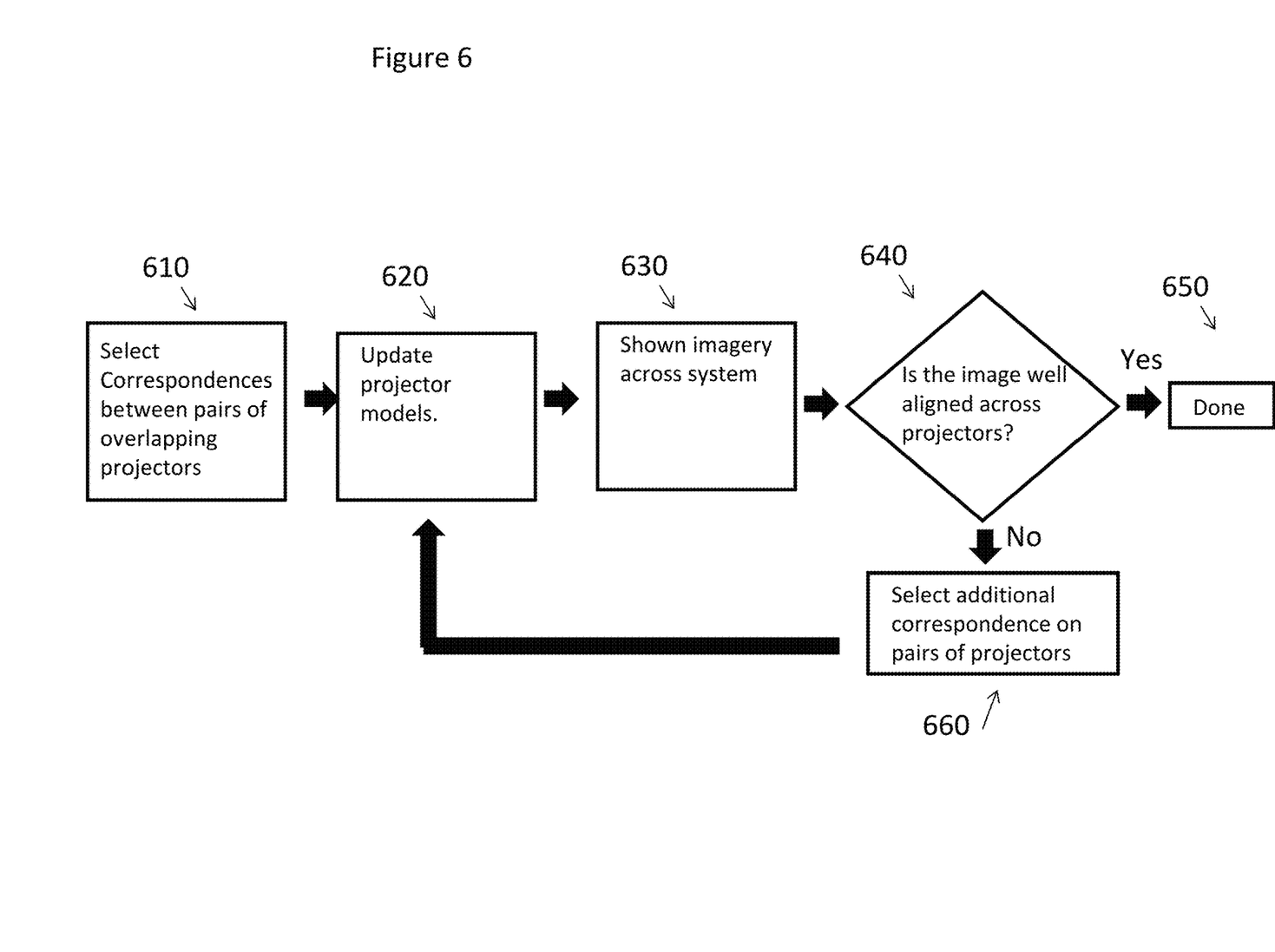
FIG. 6 is a flow diagram showing the steps of finding a manual calibration when the models of the projectors are known ahead of time.

FIG. 6 shows an embodiment of a process that implicates a special case in which strong estimates of the models being available ahead of time. This may be the case because the display system has been modeled, and the parameters of the projectors known. It can also be the case wherein an automatic calibration system has estimated the parameters, and the departure of the system's display from those parameters. For example, in some cases the projector positions and orientations and their focal lengths, radial distortions and lens shifts are known to within some tolerance. In another case, the user can employ all of this information to find an appropriate mapping between the projectors and the screen. However, because of the prevailing tolerances, the resulting alignment may be imperfect in a typical circumstance.

As described previously above, the user or other mechanism can select correspondences between a pair of overlapping projectors (step 610). That information can be used to update the models (step 620), which implicitly forms a mapping from one projector the other projector. In an illustrative embodiment, the process includes a non-linear minimization of the sum-squared errors of the distance of the rays from the projectors passing through their correspondences, while allowing the parameters of the models of the projectors to change within the known tolerances. Once each model is updated, the user or other mechanism can display imagery across the system (step 630), and then decide if the image is well aligned across the system visually (decision step 640). If the image is not well aligned, then the user or other mechanism can select additional correspondences between projectors so as to update each model (steps 660 and then 620 again). The associated steps 620, 630, 640 and 660 can be repeated until done (step 650). As previously described above, the user or other mechanism can choose to decide to correct any disagreements by defining the mapping between projectors as a displacement field, and adding that displacement field to the model of the projector projecting to the screen.

Note that for the minimization described for FIG. 6, it can be desirable for the minimization to use fiducials that are selected on the screen with known three-dimensional (3D) coordinates, such as the corners of the screen, or visible intersections between the sections of the screen. These constraints in 3D can add speed, and provide additional robustness to, the overall procedure.

Figure 7:
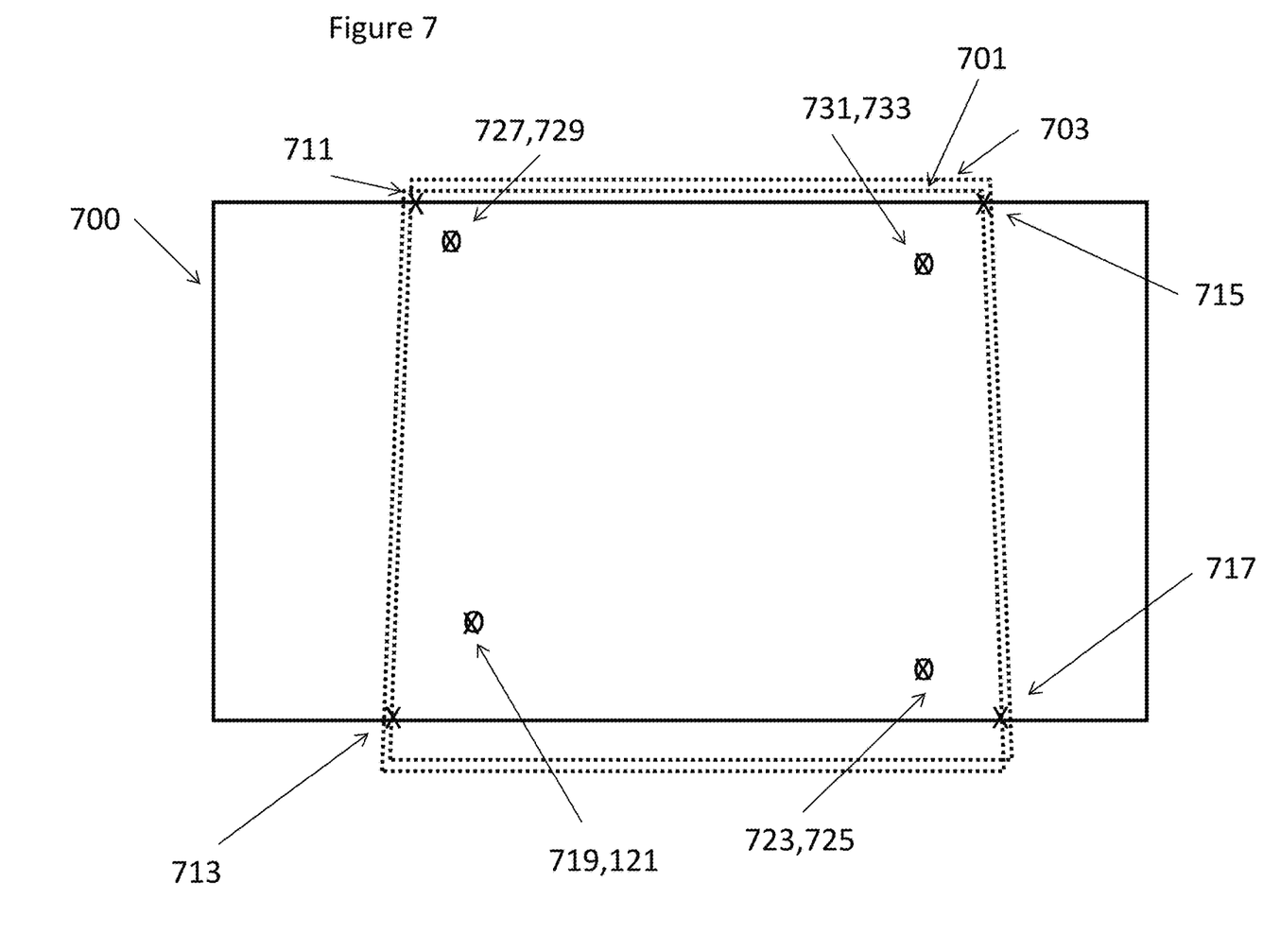
FIG. 7 is a block diagram of an exemplary display system with manual calibration for measuring distortions between colors in a projector according to an embodiment.

FIG. 7. Shows an embodiment of a single projector on a flat screen. By way of example, the projector has two colors which land on the screen 700 and fill regions 701 and 703 respectively. This is an example of lateral color distortion, where the colors of a projector do not overlap in the way they are supposed to. In this case, points can be selected in each color as to form a mapping between the color channels. In this case, 4 pairs of correspondence pairs 'X' to 'O' have been selected: 719 to 721, pair 723 to 725, pair 731 to 733 and pair 727 to 729. Once a mapping has been formed between the colors into a common coordinate system, the common coordinate system can be mapped to the screen. In this case, points 711, 713, 715 and 717, indicated by 'X's are selected. Thus, the procedure is effectively identical to FIG. 1', only the correspondences are being selected in the same projector, but different color channels.

Figure 8:
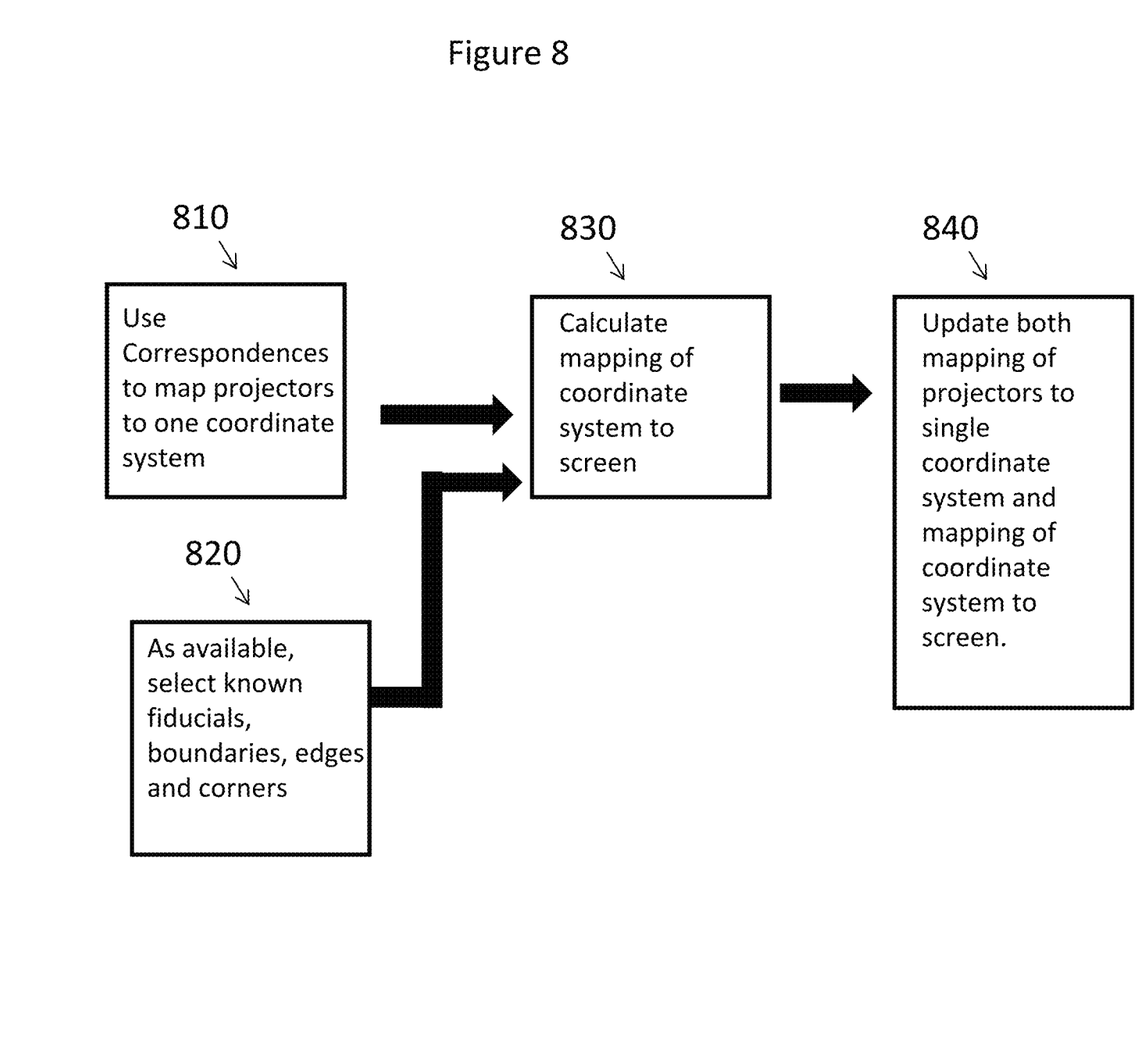
FIG. 8 is a flow diagram showing the steps of a procedure for finding a manual calibration where the mapping from the projectors to the common coordinate system and the mapping from the coordinate system to the screen are updated concurrently.

FIG. 8 shows an embodiment where additional information is used to update the mapping from the projectors to the common coordinate system. The first few steps are exactly as was done in FIG. 4. In step 810, the mapping to the common coordinate system is formed as described above. In step 820, additional information is collected about boundaries, known fiducial points, edges, and/or corners. (In FIG. 4, such information was collected for the boundaries of the screen and the corners points). In Step 830, the combined information is used to form a mapping from the common coordinate system to the screen as was done in FIG. 4. In step 840, both the mappings to the common coordinate system and the mapping from the common coordinate system to the screen are updated concurrently. In an illustrative embodiment, this is accomplished as described above by modeling the projectors as optical objects. In this case, the mapping from the projectors to the common coordinate system may be improved by the estimates of the projection matrix of the projectors. And, that changed mapping to the common coordinate system can affect the mapping from the common coordinate system to the screen. For example, the result is that the minimization described with FIG. 4 of finding the optical properties of the projector can be used to change both the mapping to the common coordinate system and the mapping of the common coordinate system to the screen simultaneously.

II. Alternate and Additional Embodiments and Examples

The following are particular examples of implementations in which the teachings of the inventive concepts herein can be employed.

By way of background and further description, assume that with reference to FIG. 1, each projector operates in red, green and blue primary colors. That is, the projector forms images by projecting a red, green and blue pixel on top of each other. In this case, each projector can be treated as three (3) projectors. The mapping between the color channels within a single projector can be based on a pin-cushion or barrel distortion warp. By selecting points in each color, the user or other mechanism is able to find the parameters of the known distortion function, and then move each color separately to a common coordinate system as described in FIG. 7. The procedures described above can then continue to operate in the manner previously described, except that in this example, the system is treated as effectively using six projectors instead of two, and the inter-projector mapping is modeled differently than the intra-projector mappings.

Another example is the case of a projector attempting to show a multiplicity of buffers. It could be a 3D image, intending a different image for each eye. It is contemplated that each buffer can be intended for a different person's viewing habits and desires. If the projectors are using polarization, slight color shifts, or time division multiplexing to each eye, or similar, then it is contemplated that a distinct color can be stored in each buffer. Without the aid of glasses to select out the color shift or polarizations, or the timing of the buffers, the user can view the images generated by both buffers in this example, as also provided in FIG. 7. The system can then effectively be treated as a two-color system, exactly as if it were operating as a three-color system in accordance with the above description.

In an illustrative example four (4) projectors are mounted to fill a flat screen in a 2×2 pattern, with each projector driven by a different computer, with the computers communicating TCP/IP over Ethernet cables or another acceptable communication link and/or protocol. Each projector in the group displays a different solid color to clearly demonstrate to the user or other mechanism the location of the overlap region between each of the projectors. The user or other mechanism selects points in the overlap region of a pair of projectors forming correspondences between both projectors. This selection can be accomplished particularly using a mouse or similar pointing device. The user or other mechanism then selects the points on both projectors, forming correspondences between the two projectors. A computer program/software application can indicate the correspondences in each projector by showing the same image, such as cross hairs, but in a different color on each projector. In an illustrative embodiment, the cross-hairs can be antialiased over a large number (a multiplicity) of pixels to create an intensity fall-off that enhances the ability of the user in positioning the cross-hairs to within sub-pixel alignment.

Using these overlapping points, an exemplary software process and/or algorithm is able to form a common coordinate system across all four (4) projectors using a homography. As more points are selected, the model between the projectors is over-constrained. That is, the mapping has a certain number of parameters, and when there are too many points, it is typically not possible to exactly use the mapping and achieve a perfect match between the overlapping points, where the second stage in the mapping may be desirable. Using thin plate splines, or other representations of a displacement field, a correction can be made to the mapping function so that in the common coordinate system created between each pair of projectors, the locations in the overlap region that have been indicated to overlap actually do overlap. Once a common coordinate system is established, it is possible to show a pattern, such as a grid of points across the entire projector system. The user or other mechanism can observe errors in the mapping to the single coordinate system by noting that points on each projector do not overlap substantially perfectly, thereby indicating errors, which would not exist if such points actually overlapped substantially perfectly. The user or other mechanism can then optionally select more points to help improve the mapping between projectors, or move the existing points on the grid in each projector separately to refine the mapping.

Once satisfied, the user or other mechanism can then treat the entire system of projectors as one large coordinate system and move points around the region of the union of the projectors, where moving a point affects all the projectors underneath the point. By way of example, underneath the points an image can be displayed as warped to the screen in real time. The user or other mechanism can therefore decide how the input image will be mapped to the screen. Note that a variety of images can be used. Grids of rectangles are useful in an effort to make all the rectangles appear uniform in size. Moreover, grids of lines are useful to try and make the lines appear parallel and perpendicular. If possible, the user or other mechanism can display the effects of changes to the system in real time. One technique for performing this is to use OpenGL or DirectX to represent the warp and employ a conventional graphics card on a processing device (such as a computer) to quickly update the warp and demonstrate the results.

Another example of an implementation employing the illustrative concepts provided herein is providing several projectors on a cylindrical screen of approximately known radius, height and angle, where the edges of the screen are visible, and seams on the screen are visible at known locations, such as described in FIG. 4. In this case, points are selected in the overlap region as described previously above. The corner points of the screen can also be selected and the points where there are visible fiducials on the screen, such as at the edge of seams in the screen. By selecting these points, a 3D correspondence (the location of the screen) to the 2D location in the projector is effectively created. The mapping from the input to the projector to the screen can be modeled using a pin-hole model of a projector, or similar model. In one method, by selecting six (6) points on each projector, the projection matrix to the screen for each projector can be formed. Overlap points to refine the model are then selected, or corrections are added on top of the model to map each projector correctly on top of each other. Alternatively, it is contemplated that the additional information can be used in an effort to increase the complexity of the model, such as introducing a correction for radial distortion in the projection lens.

According to an exemplary implementation, when less than six points are available, the problem to be solved is identical to the bundle adjustment processes/algorithms employed in machine vision systems. In these processes/algorithms, there is a minimization to allow determination of the parameters of the projector, where those parameters can include position, orientation, focal length, center of projection, etc. The goal is to minimize the squared error of the re-projection of the points the projectors have been selected to have in common back into the projector, and the squared error of the points on of the screen that have been selected. Note that if the screen dimensions are only roughly known, those parameters can be included in the minimization, and good results can still be achieved. The step of mapping the curve properly on the edge of the screen can be added to this type of minimization, as in the description of FIG. 4.

Furthermore, when these types of minimizations are done, the results can be used in forming the mapping from one projector to another. That is, information about the screen and the parameters of projection can be used to simultaneously form a mapping from the projectors to each other, and to form a mapping from the common coordinate system to the screen. In this way, the geometry of the screen can be used to help form a mapping from the projectors to the common coordinate system. This concept was discussed in Step 840 of FIG. 8.

A procedure that is useful in several screen types is that of vanishing points. Sometimes, a user or other mechanism can readily select a point vertically below a point on the top of the screen. Adding in corner points indicates a rectangle that is projected by the projector. That rectangle can be sufficient to estimate the angles between the projector and the screen using the technique of vanishing points. This type of technique is useful for initiating non-linear minimizations. This type of technique is also applicable in circumstances in which some parameters of the projector (for example the internal parameters) are known. These internal parameters can include the focal point on the location of the projector. Thus, the technique can be used in conjunction with the additional information provided by the known parameters.

In another example, consider FIG. 4 where the screen is not a cylinder, but perhaps an extruded screen, that is a screen that in this case is the same vertically. Even in this situation, good results can be achieved. If enough points are selected on the top and bottom boundaries or a projector, the boundary can be retraced back into the projector, exactly as was done with the points. The projection parameters of the projector can then be determined by minimizing the shape of the screen subject to the constraint that the top and bottom edge must be parallel curves. There have been several methods for dealing with extruded screens using camera/projector feedback systems that suggest algorithms that can be used here, including those published by Aditi Majundar et. al, and that are used in ScalableDesktop, a product published by Scalable Display Technologies of Cambridge, Mass.

For each screen type, there are many exemplary procedures by which to calculate how the image should be mapped to the screen. For a cylindrical screen, an image is typically wrapped around the cylinder so that pixels are given equal angle along the cylinder, and pixels are spread out evenly along the direction perpendicular to the axis of the cylinder. The information from the overlaps, or from the projector positions, can be used to estimate the effective resolution of the system, and what resolution image is optimally viewed on the screen. A simple technique to accomplish this estimate can be to calculate the number of pixels lost in the overlap region. An alternate technique for displaying an image can employ rendered scenery based on frusta. In this illustrative example, an eye-point can be set at the center of the cylinder, and an appropriate frustum is chosen for each projector depending on the angular fill of the projector. The user or another mechanism can move the eye-point/viewpoint to a location different than the center of the cylinder in alternate examples.

In one example, a screen can define a section of a spherical screen, illustratively extending 60 degrees right to left and 30 degrees up/down. The mapping for this type of screen can be solved in nearly the same way as the cylindrical screen described above, by selecting points to constrain the multiple projectors, and then selecting points on the edges of the screen to form curves. Those curves can then be used to create a minimization to iterate the optical properties of the projector to best fit those curves, while respecting the constraints between the projectors.

In a further example a screen can include corners in it, or include hard edges. That can be the case when projecting on the corners of a room, or on an overall screen system that consists of several flat screens, which converge in a joint. This case is substantially similar to that of other screens where the user can additionally use a mouse to click on the edges or corners of the screen to indicate where the mapping is expected to have a sharp change in direction. Similar to the flat screen case, homographies can be established with respect to each wall, and corner points can be selected to form overall mappings.

In yet another example a screen is provided about which nothing is known, other than it is possibly smoothly varying. In this case a mapping can still be formed among all the projectors to create a single coordinate system. As no prior information is known, a small number of points are moved in the uniform coordinate system to indicate where the image should be located. This procedure can start by selecting where the corner points should be located (e.g. a 2×2 system), and then iteratively doubling the number of points. In each iteration, the new points can be determined by using spline-based interpolation (or another interpolation method) from the previous iteration. Only points that should be changed are actually moved. Because of the supposed smoothness constraint, the expectation is that, with each iteration, the mapping will become ever closer to the level of precision which the user desires. Note that even in this case where no information is available about the screen, and where it is possible that a substantial number of points are to be moved, this procedure still saves significant time relative to more-conventional approaches. In the state of the art, a user would be required to move points on every single projector independently. Conversely, according to the above-described novel procedure, a user or other mechanism need only move the points for the entire system and not individual projectors.

One goal is to determine correspondences between projectors at a sub-pixel level. Thus, when moving points around on the screen, points are typically moved at the single pixel level, so that correspondences between projectors are not established at the sub-pixel level. However, the eye is very sensitive to averaging over regions, and that averaging can be used to achieve sub-pixel matching. For example, instead of selecting a point on a projector, functions with intensity falloffs over many pixels can be moved about the screen—Gaussian functions, for example. The eye is able to interpolate the intensity peak of the function, and the smooth edges of the fall-off on the edges. Thus, the user may move the peak sub-pixel amounts and match the peaks and edges from one projector to another, and therefore find sub-pixel accuracy correspondences. Similar approaches can be accomplished by using anti-aliased cross hairs over many pixels, or using other images with intensity gradients. Automated techniques that determine sub-pixel level correspondence can also be employed.

It should be clear that the system and method described herein offers a highly effective technique for mapping multiple projectors that provide images to a single screen of a wide range of geometries. The system and method is likewise applicable to a variety of particular applications. Such applications include, but are not limited to (a) setting projector values, (b) setting warping box values, (c) setting EasyBlend™ SDK values, (d) setting OMTE parameters, setting Nvidia (graphics cards and engines) color curve parameters, (e) setting the desired resolution of the DOPP screen, (f) accounting for bezels on screens that are ganged together, (g) for use generally in deploying multiple projectors, single projectors, flat panel displays (e.g. correction of gamma curves and spatial intensity), white boards/SmartBoards, touch screens and/or flight simulators.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, additional correction steps can be employed beyond those described herein. These steps may be based particularly upon the type of display device and display surface being employed. Moreover, where a human user can perform a step of a procedure, it is expressly contemplated than an appropriate automated device or mechanism, such as a machine vision system that acquires images of the screen and performs conventional, programmed vision system processes on the images, can be used interchangeably with the human user. Hence the term "manual" should be taken broadly to include steps that are also performed in entirely, or at least in part with the assistance of automation. Likewise, it is expressly contemplated that the techniques provided herein can be applied to calibrate a single projector that can be part of a system of two or more projectors, or a single unit within a projection system. Where calibration/alignment of a single projector is performed, the term "projectors" can be taken broadly to include separate "components" of a single projector image. In addition, it is expressly contemplated that any of the procedures and functions described herein can be implemented in hardware, software, comprising a computer-readable medium consisting of program instructions, or a combination of hardware and software. Accordingly, this description is meant to be taken only by way of example, and not to otherwise limit the scope of this invention.

What is claimed is:

1. A method for calibrating one or more projectors, comprising:
    displaying, via a first projector, a first projected image on a screen;
    displaying, via a second projector, a second projected image on the screen, thereby defining an overlap region whereby the first projected image and the second projected image overlap on the screen;
    selecting a first plurality of correspondences corresponding to the first projector and selecting a second plurality of correspondences corresponding to the second projector such that the each of the first plurality of correspondences overlap with and correspond to a respective one of the second plurality of correspondences, the first plurality of correspondences being distinct from the first projected image and the second projected image and the second plurality of correspondences being distinct from the first projected image and the second projected image;
    determining a first mapping from the first projector to the second projector using the first plurality of correspondences and the second plurality of correspondences, thereby defining a common coordinate system among the first projector and the second projector;
    selecting a third plurality of correspondences corresponding to points on the screen, at least one of the third plurality of correspondences corresponding to at least one of: a boundary point; a curve; a corner; or an edge; and
    determining a second mapping from the common coordinate system to the screen using the selected third plurality of correspondences;
    displaying, via both the first projector and the second projector, an image on the screen based upon the first mapping and the second mapping.

2. The method of claim 1, wherein the first plurality of correspondences and the second plurality of correspondences are at arbitrary positions within the overlap region.

3. The method of claim 1, where in at least one of the third plurality of correspondences is outside of the overlap region.

4. The method of claim 1, wherein the step of selecting the first plurality and second plurality of correspondences displays images on the screen defined by intensity fall-offs at intended selected correspondences, whereby the images of the first projector and second projector are movable to achieve sub-pixel matches between the images of the first projector and the second projector.

5. The method of claim 1, wherein the step of selecting the first plurality and second plurality of correspondences comprises displaying the correspondences in a different color within the overlap region to allow identification of alignment as at least two colors combining to form a new color.

6. The method of claim 1, wherein the first plurality of correspondences and the second plurality of correspondences are within the overlap region.

7. The method of claim 1, wherein more than two projectors share the same overlap region.

8. The method of claim 1, wherein the overlap region occupies a portion of the screen.

9. A method for calibrating one or more projectors, comprising:
    displaying, via a first projector, a first projected image on a screen;
    displaying, via a second projector, a second projected image on the screen, thereby defining an overlap region whereby the first projected image and the second projected image overlap on the screen;
    selecting a first plurality of correspondences corresponding to the first projector and displaying the selected first plurality of correspondences with the first projected image in the overlap region on the screen, the first plurality of correspondences being non-co linear;
    selecting a second plurality of correspondences corresponding to the second projector and displaying the selected second plurality of correspondences with the second projected image in the overlap region on the screen such that the each of the first plurality of correspondences displayed on the screen overlap with and correspond to a respective one of the second plurality of correspondences displayed on the screen, the second plurality of correspondences being non-co linear;
    determining a first mapping from the first projector to the second projector using the first plurality of correspondences and the second plurality of correspondences, thereby defining a common coordinate system among the first projector and the second projector, the first mapping comprising a homography between the first plurality of correspondences and the second plurality of correspondences;
    selecting a third plurality of correspondences corresponding to points on the screen, at least one of the third plurality of correspondences corresponding to at least one of: a boundary point; a curve; a corner; or an edge; and determining a second mapping from the common coordinate system to the screen using the selected third plurality of correspondences;

displaying, via both the first projector and the second projector, an image on the screen based upon the first mapping and the second mapping.

10. The method of claim 9, wherein the first plurality of correspondences and the second plurality of correspondences are at arbitrary positions within the overlap region.

11. The method of claim 9, where in at least one of the third plurality of correspondences is outside of the overlap region.

12. The method of claim 9, wherein the step of selecting the first plurality and second plurality of correspondences displays images on the screen defined by intensity fall-offs at intended selected correspondences, whereby the images of the first projector and second projector are movable to achieve sub-pixel matches between the images of the first projector and the second projector.

13. The method of claim 9, wherein the step of selecting the first plurality and second plurality of correspondences comprises displaying the correspondences in a different color within the overlap region to allow identification of alignment as at least two colors combining to form a new color.

14. The method of claim 9, wherein the first plurality of correspondences and the second plurality of correspondences are within the overlap region.

15. The method of claim 9, wherein more than two projectors share the same overlap region.

16. The method of claim 9, wherein the overlap region occupies a portion of the screen.

17. A system for calibrating one or more projectors, comprising:

a first projector for displaying a first projected image on a screen;

a second projector for displaying a second projected image on the screen, thereby defining an overlap region whereby the first projected image and the second projected image overlap on the screen; and a processor configured to:

select a first plurality of correspondences corresponding to the first projector and selecting a second plurality of correspondences corresponding to the second projector such that the each of the first plurality of correspondences overlap with and correspond to a respective one of the second plurality of correspondences, the first plurality of correspondences being distinct from the first projected image and the second projected image and the second plurality of correspondences being distinct from the first projected image and the second projected image, determine a first mapping from the first projector to the second projector using the first plurality of correspondences and the second plurality of correspondences, thereby defining a common coordinate system among the first projector and the second projector;

select a third plurality of correspondences corresponding to points on the screen, at least one of the third plurality of correspondences corresponding to at least one of: a boundary point; a curve; a corner; or an edge, and determine a second mapping from the common coordinate system to the screen using the selected third plurality of correspondences;

wherein an image is displayed on the screen, based upon the first mapping and the second mapping.

18. A system for calibrating one or more projectors, comprising:

a first projector for displaying a first projected image on a screen;

a second projector for displaying a second projected image on the screen, thereby defining an overlap region whereby the first projected image and the second projected image overlap on the screen; and a processor configured to:

select a first plurality of correspondences corresponding to the first projector and displaying the selected first plurality of correspondences with the first projected image in the overlap region on the screen, the first plurality of correspondences being non-co linear;

select a second plurality of correspondences corresponding to the second projector and displaying the selected second plurality of correspondences with the second projected image in the overlap region on the screen such that the each of the first plurality of correspondences displayed on the screen overlap with and correspond to a respective one of the second plurality of correspondences displayed on the screen, the second plurality of correspondences being non-co linear;

determine a first mapping from the first projector to the second projector using the first plurality of correspondences and the second plurality of correspondences, thereby defining a common coordinate system among the first projector and the second projector, the first mapping comprising a homography between the first plurality of correspondences and the second plurality of correspondences;

select a third plurality of correspondences corresponding to points on the screen, at least one of the third plurality of correspondences corresponding to at least one of: a boundary point; a curve; a corner; or an edge; and determine a second mapping from the common coordinate system to the screen using the selected third plurality of correspondences;

wherein an image is displayed on the screen, based upon the first mapping and the second mapping.

* * * * *